June 28, 1949.　　　J. R. HALE　　　2,474,419
FUEL INJECTION APPARATUS
Filed Feb. 2, 1945　　　2 Sheets-Sheet 2
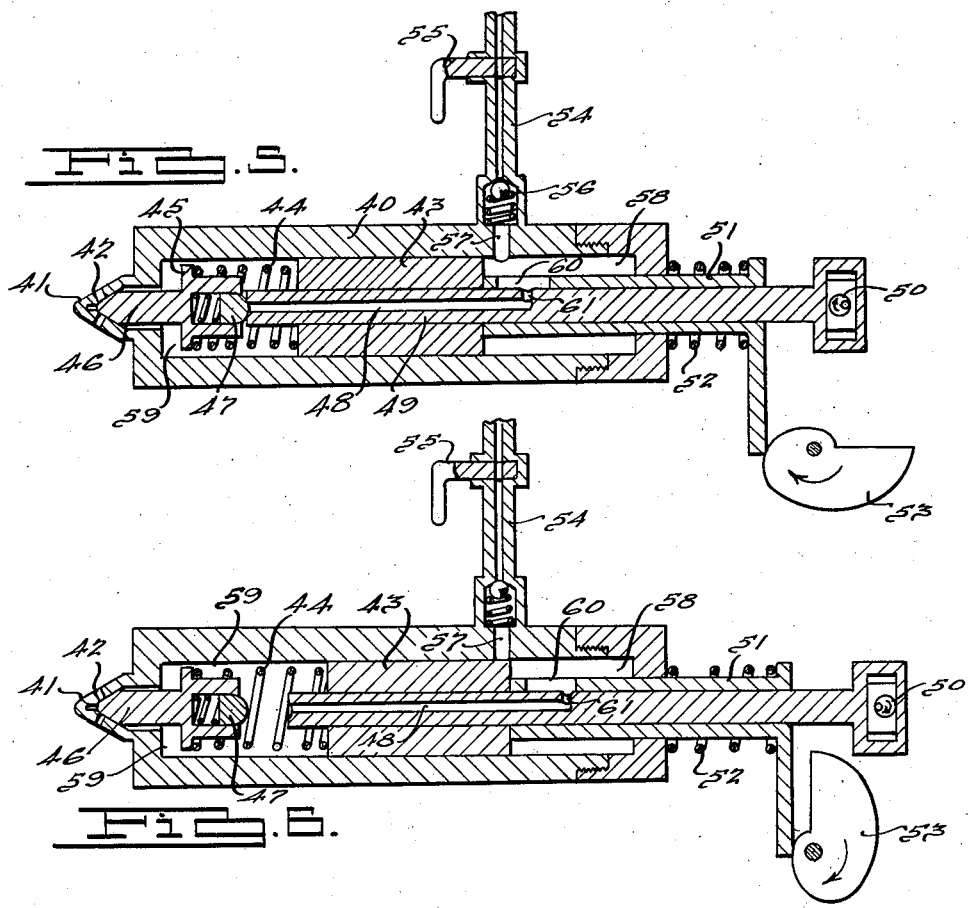
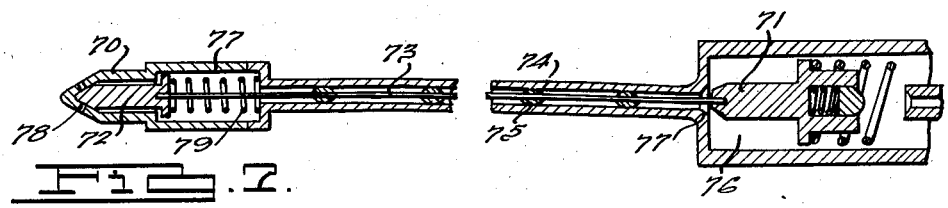
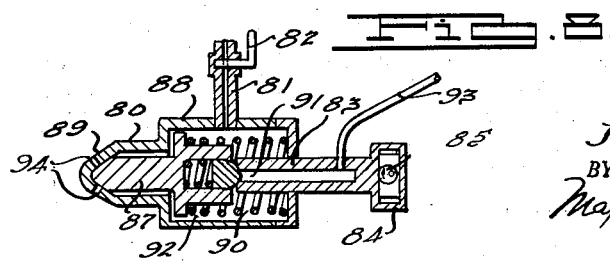
INVENTOR.
Jesse R. Hale
BY
Maxwell K. Murphy
ATTORNEY.

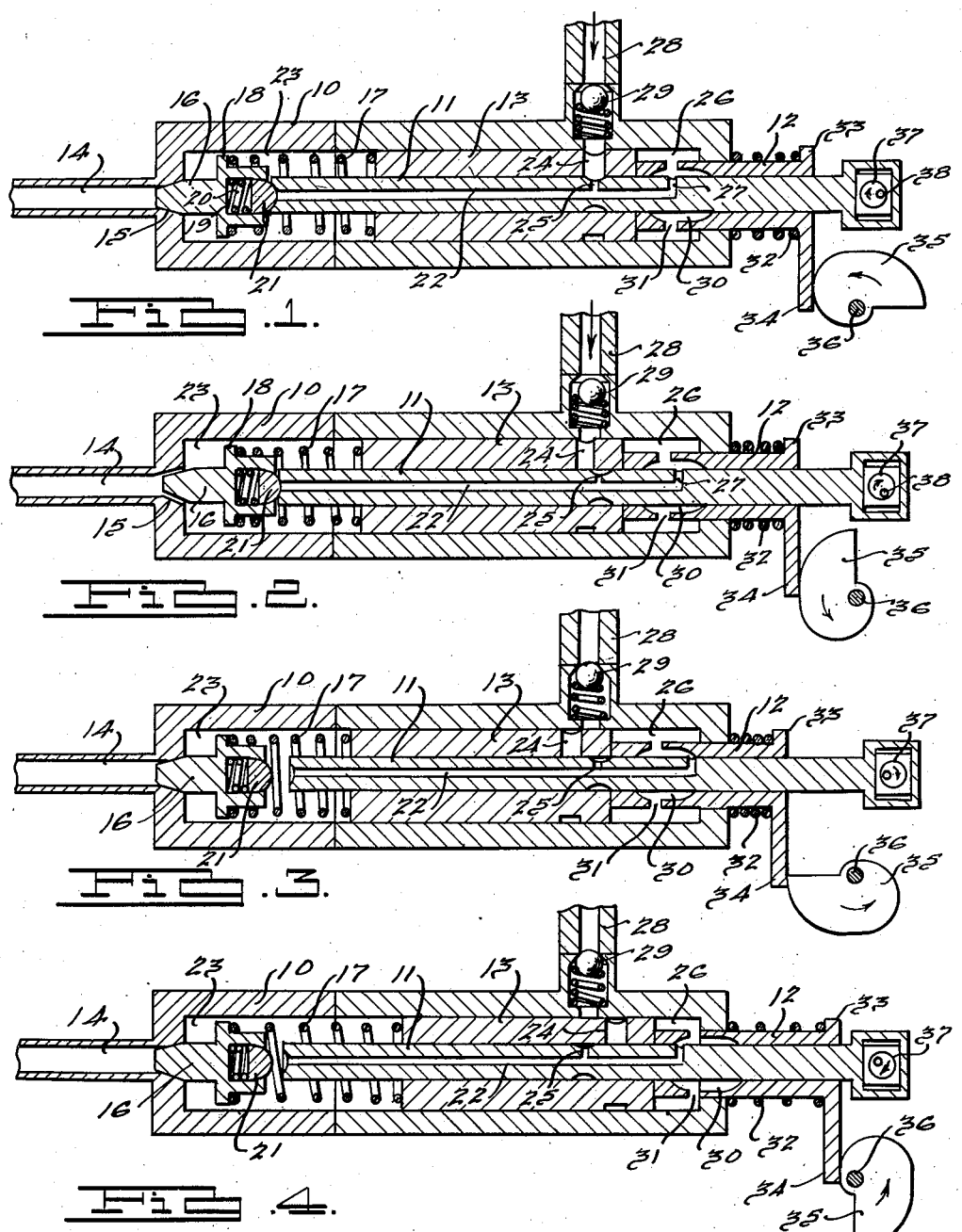

Patented June 28, 1949

2,474,419

UNITED STATES PATENT OFFICE 2,474,419

FUEL INJECTION APPARATUS

Jesse R. Hale, Berkley, Mich.

Application February 2, 1945, Serial No. 575,893

15 Claims. (Cl. 103—41)

1

This invention relates to fuel injection apparatus and has for its principal object the provision of a simple and economically constructed fuel injector or injection pump which will furnish positive yet flexible control of fuel delivery, and which is equally advantageous when used as a unit or as one of a cluster.

While my improved pump is particularly applicable to the Diesel engine, it is also useful for injection of lighter fuels. It is common knowledge that the exceptional ruggedness and weight of the Diesel engine is necessary because of the excessively high peak cylinder pressures found therein during operation. These high peak pressures are caused by improperly controlled combustion in the cylinders with resultant uncontrolled rapid pressure rise.

By providing an improved injection pump by means of which the combustion may be accurately controlled, I am able to secure a substantial reduction in the cylinder peak pressure while actually increasing the B. M. E. P.

In the compression ignition cycle, the injection of the fuel has a refrigerating effect in the cylinder due to the large particles of fuel drawing heat from the surrounding air. This causes an ignition lag and results in an instantaneous pressure rise at the time of ignition. During this period there are two reactions taking place, physical and chemical, both required before combustion can ensue, and both having set rates.

My improved injector materially reduces the refrigerating effect by first, reducing the volume of injected fuel at the start of injection and secondly, by reducing the size of the droplets or particles at the start of injection. Assuming that the fuel particles are spherical (which is substantially their shape and knowing that the surface area of a sphere varies as the square of the volume, it is clear that the smaller the particles, the greater the fuel particle area exposed to cylinder heat, and more rapid combustion results.

With relatively small fuel particles at the start of injection and a gradual increase in particle size as the volume of injected fuel increases, a smooth and even combustion takes place because the smaller particles substantially complete their physical and chemical reaction necessary for combustion by the time the larger droplets enter the combustion zone, thus additional heat is released for burning the increased volume of fuel. In other words, instead of an instantaneous combustion taking place, an instant after a certain amount of fuel has been injected, progressive burning takes place, combustion heat from the

2 initial small particles is used and substantially all of the ignition lag is eliminated besides materially reducing the sudden pressure rise.

The progressive increase in fuel volume and particle size made possible with my injector has another important effect, i. e., that of increasing spray turbulence. This increase in turbulence is caused by the fact that the initially injected minute fuel particles have relatively small mass and do not penetrate far. Thus a large spray cone is formed and initial burning takes place close to the injector. As the fuel particles increase in size, a greater penetration is achieved with a reduction in spray cone, but as particle size increases the unheated fuel drives through the smaller and partially burned particles and forces a thorough mixing of the burned and unburned droplets. By this action, an induced turbulence is created from the injected volume and proper dispersal of fuel throughout the available air is aided.

Other objects and advantages of my improved pump will be apparent from the following description.

In the drawings which accompany the description:

Fig. 1 is a longitudinal vertical section through the injector, the parts thereof being shown in one position of operation;

Fig. 2, 3 and 4 are views similar to Fig. 1, but showing the parts in other positions of operation;

Fig. 5 is a longitudinal sectional view of a modified form of injector pump;

Fig. 6 is a view similar to Fig. 5 with the parts in a different position;

Fig. 7 is a sectional view of another modification, and

Fig. 8 is a sectional view of still another modification.

Referring now to Figs. 1 to 4 inclusive, it may be seen that my improved injector comprises a two-part housing 10 that is separable for purposes of assembly. An actuator 11 is disposed in the housing for reciprocation axially thereof and is guided in the housing 10 by means of a tappet 12 and a plunger 13, both of these members also being adapted for an axial reciprocation in the housing.

The housing 10 has an outlet 14 which leads to the ignition chamber (not shown). Communication between the outlet 14 and the interior of the housing is by means of a valve opening 15 which is opened and closed by a needle 16 forming part of a needle valve. The needle is of tapered form and is adapted to tightly fit the opening 15. A coiled compression spring 17 bears against an annular shoulder 18 formed on the needle and against the lower end of the plunger 13 and acts to control the relative movement of these members as will be later fully explained.

The needle 16 is also provided with an internal bore 19 in which is seated a coiled compression spring 20 which bears on the flat lower end of a hemispherical member 21. The latter has a rounded upper end which is adapted to seat in the lower end of the actuator 11 which has been slightly hollowed out as illustrated.

The actuator 11 has an axial bore 22 which is adapted to communicate respectively with a chamber 23 below the plunger 13, an inlet or charging port 24 formed in the plunger by means of passage 25, and a chamber 26 above the plunger by means of a passage 27. The charging port 24 communicates with a fuel inlet pipe 28, a spring loaded ball check valve 29 being interposed therein.

The tappet 12 bears directly on the upper end of the plunger 13 and has an internally formed annular chamber 30 disposed in surrounding relation with the passage 27 and communicating with the chamber 26 by means of ports 31. A coil spring 32 acts between the upper end of the housing and the underside of a shoulder 33 integrally formed on the tappet. The shoulder has a lateral extension 34 which contacts a cam 35 mounted at 36 for rotation by the engine. The cam 35 is preferably of the rapid cut-off type and functions in conjunction with the springs 17 and 32, to control the plunger and tappet position.

The actuator 11 is controlled by an eccentric 37, suitably mounted at 38 for rotation by the engine. The relative positions of the cam 35, the eccentric 37 and the various other parts of the injecor are shown in Figs. 1 to 4 inclusive under different cyclic conditions and these figures will be now referred to for an explanation of the operation of the device.

In Fig. 1, the charging chamber 26 is being charged with fuel under nominal pressure through pipe 28, port 24, passages 25, 22 and 27 and port 31. At this time injection chamber 23 is sealed off from communication with passage 22 by member 21, and needle 16 is seated in valve opening 15 thereby sealing off opening 14. Plunger 13 is traveling downwardly to compress the fuel in chamber 23 which has just been filled.

In Fig. 2 the cam 35 and eccentric 37 have rotated 90° which has caused tappet 12 and plunger 13 to move to the left and valve actuator 11 to move toward the right or upper end of the assembly. This permits the pressure in chamber 23 (resulting from the downward travel of the plunger) to act on the lower surface of shoulder 18 of needle 16 and lift the latter off its seat at the rate determined by actuator 11, thereby opening chamber 23 to outlet 14. Chamber 23 is still closed off from passage 22 because member 21 is still seated against the lower end of the actuator 11 (which is moving upwardly), the pressure in chamber 23 being sufficient to move the needle against the pressure of spring 17 at this time. Chamber 26 is still open to fuel inlet pipe 28 although cam 35 has started to move plunger 13 downwardly or to the left.

Fig. 3 shows the parts after an additional 90° rotation of the cam 35 and eccentric 37. The cam 35 has moved the tappet 12 and plunger 13 toward the left to cut off communication between port 24 and pipe 28. At the same time passage 25 has been blanked off. Chambers 23 and 26 are opened to one another through axial passage 22 which action causes an instantaneous drop in pressure in chamber 23. This, in turn, permits spring 17 to close the needle valve and ends the injection part of the cycle.

Fig. 4 shows the parts after the last 90° of movement of cam 35 and eccentric 37. It should be noted that immediately cam 35 has rotated past its Fig. 3 position, tappet 12 and plunger 13 move rapidly upwardly or to the right as is permitted by the shape of the cam, the springs 17 and 32 acting in the same direction. This rapid movement of the plunger displaces the fuel in chamber 26 and forces it under pressure through passage 22 into chamber 23 where it is ready to be injected through pipe 14.

It should be noted that the speed of inward travel of plunger 13 varies directly with engine speed, the cam 35 being directly driven by the engine, and outward travel is constant due to spring return. The needle 16 is returned to its seat by combined action of the plunger 13 and spring 17, the speed of return of the needle being governed principally by the plunger.

It may thus be seen that while the injection time interval shortens as engine R. P. M. increases, it remains substantially constant with respect to the angle of crankshaft travel. In other words, the same amount of fuel is injected for the same crankshaft rotation in degrees regardless of engine speed, and any part of the charging stroke is constant with time thus allowing a variable volumetric output as required by pumping off of the engine. This is a very important feature of my invention and constitutes one of the main points of superiority of my pump.

An important feature of the invention resides in the fact that upper chamber 58 is never completely filled during the charginge period, nor is lower chamber 59 ever completely filled.

Throttling of the engine is accomplished by advancing or retarding the actuator 11 with respect to the plunger 13. This changes the phase relation between the ports 24 and 25, the longer the interval of registration of these ports, the faster the engine R. P. M. and vice-versa.

In Figs. 1 to 4, the needle 16 has an internal blind bore 19 in which is seated the coiled compression spring 20 and the hemispherical valve member 21. The lower end of the actuator 11 is ground to fit the rounded surface of the member 21 so that a seal is provided when the member and actuator are in engagement.

The size and fit of the ports are preferably such that the spring 20 is depressed slightly when the actuator is in its extreme downward position thus good seal will always be maintained regardless of normal wear of the parts.

Figs. 5 and 6 illustrate an injection pump similar to that just described, but of the unit type, that is to say the injector supplies fuel to a single cylinder. In Fig. 5 the housing 40 is provided at one end with a spray nozzle 41 having the usual apertures 42 for delivering fuel in minute drops. The plunger 43 is acted upon by a spring 44 which also bears on a shoulder 45 of the needle 46. The latter is provided with a spring urged sealing member 47 for sealing off the passage 48 of actuator 49 which is controlled by the eccentric 50.

The tappet 51 is urged away from the housing by coil spring 52 and is reciprocated against spring pressure by cam 53. The fuel delivery pipe 54 is preferably provided with a throttle valve 55 of any suitable type for controlling fuel delivery. A ball check valve 56 is disposed in the fuel inlet and a port 57 of the restricted orifice type opens into chamber 58 which chamber is adapted to communicate with chamber 59 through tappet port 60 and port 61 and passages 48 of the actuator 49.

In operator the member 47 seals the end of actuator passage 62 just prior to port 57 being uncovered by movement of the plunger 43 by action of cam 53. Fig. 5 shows the parts in charging position with the injection chamber 59 sealed off from spray holes 42 and from the chamber 58, chamber 58 being filled through port 57.

Fig. 6 shows the parts after the fuel in chamber 59 has been injected and the needle 46 returned to its seat by the combined action of the plunger 43 and spring 44. The plunger 43 has just completed its rapid upward travel and fuel has been transferred from chamber 58 to chamber 59 as is permitted by the unsealing of passage 62.

The operation of the injector of Figs. 5 and 6 is similar to that of Figs. 1 to 4 and it has the same advantages.

Fig. 7 illustrates a form of the invention wherein the injector nozzle 70 is located at a point remote from the pump. In Fig. 7, member 71 and needle 72 are mechanically inter-connected by means of a cable 73. The latter is preferably flexible to accommodate bends in the housing conduit 74 and is guided in the conduit by slotted guides 74 which are freely slidable therein. The needle 71 has the same function as the needles 16 and 46 except that it does not close off the lower housing chamber 76, passage 97 being provided such that the chamber 76 is open to conduit 74 at all times. The needle 72 operates in a chamber 77 which forms part of the nozzle which has spray apertures 78.

A spring 79 tends to keep the needle 72 in closed position. The chambers 76 and 77 and the conduit 74 together constitute the lower injection chamber of the device. The cycle of operation is the same as that described for the other forms of the device, the member 71 and needle 72 working in unison because of the connecting means 73.

Fig. 8 illustrates a form of the device which differs from those previously described in that fuel is delivered to the injector nozzle 80 under constant pressure through a conduit 81, as in common rail systems, a throttle valve 82 of any suitable type being provided for regulation of the fuel flow. The fuel is delivered under considerable pressure, in the order of 2000 p. s. i., this pressure being obtained by means of an auxiliary pump (not shown).

The actuator 83 has a cross-head 84 which is engaged with an eccentric 85. The needle 87 is enclosed in a housing 88 which has a nozzle 89 formed on one end. A spring 90 acts between the needle and housing and tends to keep the needle in closed position. The actuator 83 has an internal passage 91 which is adapted to be opened and closed to the chamber 92 as the actuator follows the eccentric 85. The passage 91 is connected with the fuel supply by a line 93 which acts as a relief line.

In the operation of this form of the device, the pressure in injection chamber 92 is low when the passage 91 is open. When the eccentric 85 thrusts the actuator 83 downward into engagement with the hemi-spherical valve member carried by the needle 87, the pressure in chamber 92 rises very rapidly to full fuel line pressure, i. e. 2000 p. s. i. or thereabouts. Continued rotation of said eccentric will lift actuator 83 and permit the high chamber pressure to lift the needle 87 whereupon fuel will be ejected through nozzle holes 94.

Another important feature of my improved device is the valve means which functions to seal the power end of the passage through the actuator which connects the two chambers. This valve is common to all of the modifications shown.

Having thus described a few of the many possible forms my invention may assume, I wish it understood that by so doing I do not intend to limit the scope thereof except as defined in the claims appended below:

I claim:

1. In a fuel injector having a housing provided with a charging port and an ejection port; a plunger in the housing dividing the interior thereof into a pair of chambers communicating respectively with said ports; a passage interconnecting said chambers; a valve for controlling said passage and ejection port; and a spring operably connecting said plunger and valve; said spring and valve being so arranged that opening of said passage and closing of said valve is simultaneously effected.

2. The combination of claim 1 wherein the spring is free in said housing.

3. In a fuel injector having a housing provided with a charging port and an ejection port; a plunger in the housing dividing the interior thereof into a pair of chambers communicating respectively with said ports; a needle valve for controlling the ejecting port; an actuator for said valve; and a spring disposed between said plunger and valve, said plunger having a greater stroke than said actuator.

4. In a fuel injector having a housing provided with fuel inlet and outlet openings; a plunger in the housing dividing the interior thereof into two chambers each communicating with one of said openings; a needle valve in one of the chambers for controlling said outlet openings; a passage interconnecting said chambers; valve means for opening and closing said passage; a spring operably disposed between said plunger and needle valve; means for reciprocating said plunger; and means for controlling operation of said valve means in timed relation with said plunger.

5. In a fuel injector having a housing provided with fuel inlet and outlet openings; a reciprocable plunger in said housing dividing the interior thereof with a pair of chambers each adapted for connection with one of said openings; a needle valve in said outlet opening; a spring operably disposed between said valve and plunger; a valve actuator mounted concentrically with said plunger and adapted to engage said needle valve; and means for reciprocating said plunger and actuator in timed sequence.

6. In a fuel injector having a housing provided with fuel inlet and outlet openings, a reciprocable plunger in said housing dividing the interior thereof with a pair of chambers each adapted for connection with one of said openings; a needle valve in said outlet opening; a spring operably disposed between said valve and plunger; a valve actuator mounted concentrically with said plunger and adapted to engage said needle valve; a passage through said actuator for interconnecting said chambers, said passage being closed when said actuator and needle valve are in engagement;

and means for reciprocating said actuator and plunger in timed sequence.

7. In a fuel injector having a housing provided with fuel inlet and outlet openings, a reciprocable plunger in said housing dividing the interior thereof into a pair of chambers each adapted for connection with one of said openings; a needle valve in said outlet opening; a spring operably disposed between said valve and plunger; a valve actuator mounted concentrically with said plunger and adapted to engage said needle valve; a passage through said actuator for connecting said chambers and for connecting one of said chambers with said inlet openings; and valve means associated with said passage operable to interconnect said chambers only when said inlet opening is closed.

8. In a fuel injector having a hollow body divided into a pair of variable capacity chambers by means of a reciprocable plunger, means for charging one of said chambers with fuel; means for ejecting fuel from the other chamber; a needle valve for controlling the fuel ejection including a needle; a flexible connection between the needle and plunger, said needle having a shoulder adapted to be acted upon by increase of pressure in said other chamber thereby to lift said needle and open said valve.

9. In a fuel injector having a hollow body, a pair of chambers in the body; a passage interconnecting said chambers; means for charging one of the chambers with fuel; means for ejecting fuel from the other chamber; a needle valve for controlling said ejection; a reciprocable plunger operably connected with the needle valve by flexible means such that the needle valve opens and closes while the plunger is travelling in one direction.

10. In a fuel injector having a hollow body provided with a fuel inlet opening and an ejector opening, a plunger reciprocable in said body; a chamber at each end of the plunger; a valve actuator mounted concentrically with the plunger and reciprocable with respect thereto; means for reciprocating said plunger and actuator in timed relation.

11. In a fuel injector having a hollow body provided with a fuel inlet opening and an ejector opening, a plunger reciprocable in said body; a chamber at each end of the plunger; a valve actuator mounted concentrically with the plunger and reciprocable with respect thereto; means for reciprocating said plunger and actuator in timed relation; a port in said plunger adapted to register with the inlet opening; a passage in said actuator adapted to interconnect said chambers, said passage having a port adapted to register with said plunger port; and valve means for closing said passage when said ports are in register.

12. In a fuel injector, a pair of fuel chambers; a member having a discharge port associated with one of the chambers; a valve associated with the discharge port; a conduit connecting said chambers; a valve in the other chamber associated with the conduit; and means mechanically interconnecting said valves for simultaneous operation.

13. In a fuel injector, a member having a discharge port; a chamber adjacent said discharge port; a valve member in said chamber for opening and closing said discharge port; an actuator for closing said valve member; a port in said chamber for admitting fuel under pressure; a relief passage through said actuator; means for sealing said passage when said actuator is in valve closing position; mechanical means for operating said valve member; and hydraulic means for connecting and disconnecting said valve member with said mechanical means.

14. In a fuel injector, a member having a discharge port; a chamber adjacent said discharge port; a valve member in said chamber for opening and closing said discharge port; an actuator for closing said valve member; a port in said chamber for admitting fuel under pressure; a relief passage through said actuator; means for sealing said passage when said actuator is in valve closing position; a spring in said chamber for biasing said valve member to closing position; and means mechanically operated carried by said valve member for causing the member to lift under fuel pressure in response to movement of said actuator away from said closing position.

15. In a fuel injector, a member having a discharge port; a chamber adjacent the discharge port; a discharge port valve including a member movable in said chamber; a valve actuator having a passage therein for conducting fuel into said chamber; means carried by said valve member for sealing said passage when said actuator engages said valve member comprising a bore in said valve member; a rounded member slidable in said bore and adapted to engage said actuator to cover said passage; and a spring for urging said member outwardly of said bore.

JESSE R. HALE.

REFERENCES CITED

The following references are of record in the file of this patent:

UNITED STATES PATENTS

| Number | Name | Date |
|---|---|---|
| 1,852,191 | Salisbury | Apr. 5, 1932 |
| 1,883,980 | Lang | Oct. 25, 1932 |
| 1,943,718 | Bell | Jan. 16, 1934 |
| 2,223,756 | Dillstrom | Dec. 3, 1940 |
| 2,285,730 | Lindeman | June 6, 1942 |
| 2,350,434 | Wallgreen et al. | June 6, 1944 |

FOREIGN PATENTS

| Number | Country | Date |
|---|---|---|
| 146,072 | Switzerland | June 16, 1931 |